United States Patent
Protz et al.

(10) Patent No.: US 7,970,023 B2
(45) Date of Patent: Jun. 28, 2011

(54) FIBER LASER ARRANGEMENT HAVING A HIGH BEAMING POWER

(75) Inventors: Rudolf Protz, Hoehenkirchen/Siegertsbrunn (DE); Juergen Zoz, Friedberg (DE)

(73) Assignee: LFK-Lenkflugkoerpersysteme GmbH, Schrobenhausen (DE)

( * ) Notice: Subject to any disclaimer, the term of this patent is extended or adjusted under 35 U.S.C. 154(b) by 78 days.

(21) Appl. No.: 12/252,107

(22) Filed: Oct. 15, 2008

(65) Prior Publication Data

US 2009/0097508 A1    Apr. 16, 2009

(30) Foreign Application Priority Data

Oct. 16, 2007    (DE) .......................... 10 2007 049 436

(51) Int. Cl.
 *H01S 3/30* (2006.01)
(52) U.S. Cl. ........................ 372/6; 398/119; 398/162
(58) Field of Classification Search ....... 372/6; 398/188
 See application file for complete search history.

(56) References Cited

U.S. PATENT DOCUMENTS

2005/0135815 A1\* 6/2005 Gerwe et al. .................. 398/188
2007/0230527 A1\* 10/2007 Sakai et al. ................ 372/43.01

FOREIGN PATENT DOCUMENTS

EP          1 041 686 A2    10/2000
WO    WO 2005/091449 A1     9/2005

\* cited by examiner

*Primary Examiner* — Minsun Harvey
*Assistant Examiner* — Xnning Niu
(74) *Attorney, Agent, or Firm* — Crowell & Moring LLP

(57) ABSTRACT

A fiber laser arrangement having a high beaming power includes a plurality of continuously operating coherent individual fiber lasers. Pumping energy generated by a common master oscillator operated in the longitudinal mode is distributed to the fiber lasers by way of a fiber splitter, in a branched manner. An integrated electro-optical phase shifter is assigned to each individual fiber laser, and can be controlled by an electronic control system. By appropriate displacements of the optical phases in individual phases of the fiber laser arrangement atmospheric turbulence effects on the propagation path of the laser radiation to a target are compensated in order to obtain an optimal focusing of the entire laser radiation onto the remote target.

2 Claims, 1 Drawing Sheet

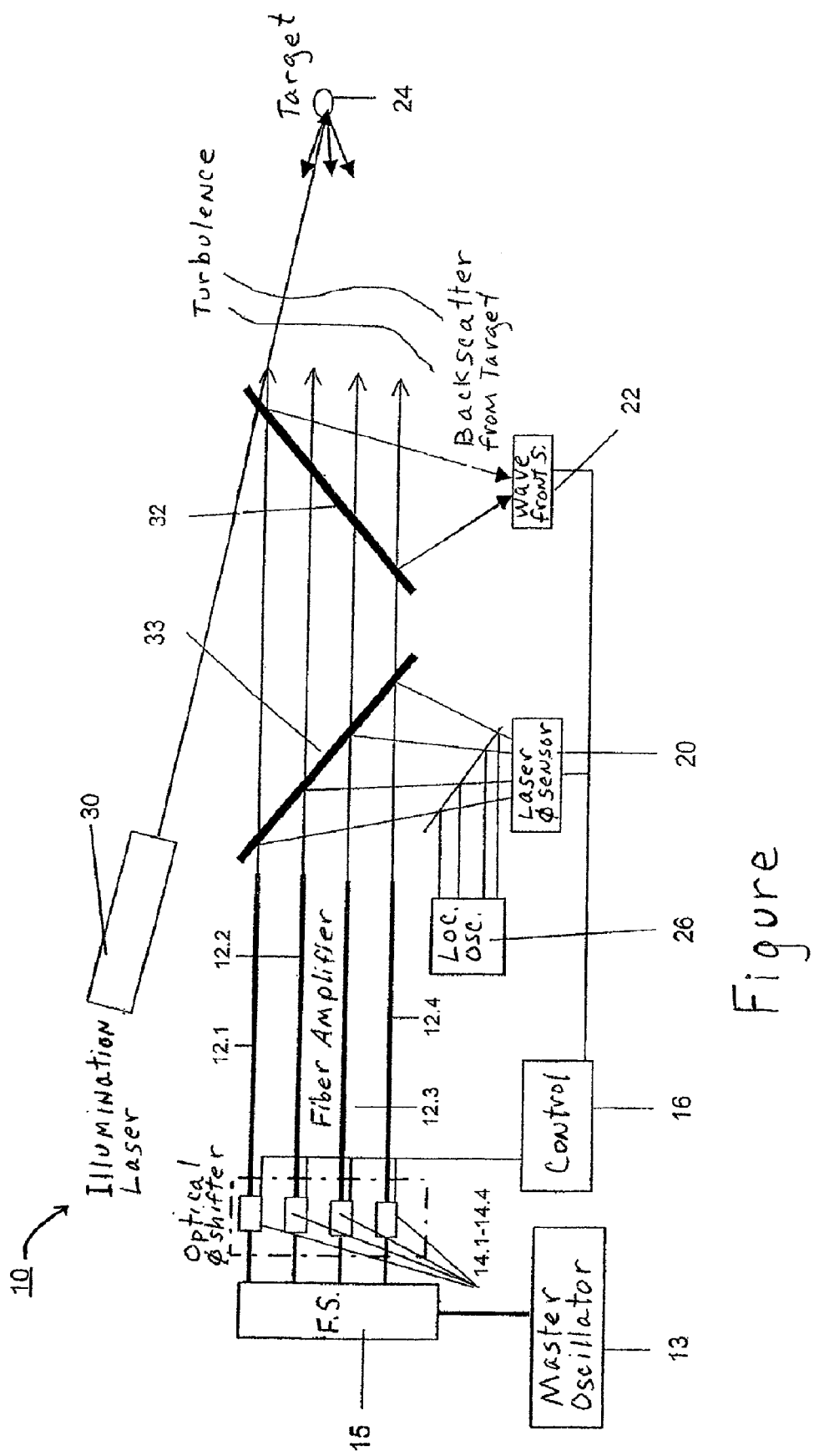
Figure

FIBER LASER ARRANGEMENT HAVING A HIGH BEAMING POWER

BACKGROUND AND SUMMARY OF THE INVENTION

This application claims the priority of German patent application no. 10 2007 049 436.1, filed Oct. 16, 2007, the disclosure of which is expressly incorporated by reference herein.

The invention relates to a fiber laser arrangement having a high beaming power.

Fiber lasers are part of the class of so-called all-solid-state lasers, i.e., diode-pumped solid-state lasers. By constructing the laser with an active medium in a waveguide which acts as a fiber, and which consists of a doped core and a cladding for the guiding of the light, the thermal problems of conventional solid-state lasers for generating high power can be overcome. Because of their considerable length, such glass lasers with optical waveguide characteristics permit a very high amplification. Modern cladding-type pumping techniques with efficient laser diodes, effective cooling concepts and the coupling of several continuously operating individual fiber lasers, have made it possible to work with such fiber lasers in the short-wave range. Compare "Laser 2005" Fair, IPG-Photonics Corp.

Adaptive mirrors have been used to compensate for atmospheric turbulences in high-energy laser arrangements. Such adaptive mirrors are inserted into the beam path on the output side of the laser arrangement and perform a wave front correction by deforming the mirror surface. Compare "Principle of Adaptive Optics", Robert K. Tyson, Academic Press, 1991. The control bandwidth that is achievable in this manner is, however, limited by the mechanical characteristics of the adaptive mirrors.

Based on the above, one object of the invention is to provide an improved fiber laser arrangements of the type described above. More particularly, an object of the invention is to improve the beaming quality and eliminate the turbulence interferences occurring during the practical use of such fiber laser arrangements.

These and other advantages are achieved by fiber laser arrangement according to the invention, in which solid-state fiber lasers, particularly of laser-diode-pumped neodymium, herbium, or erbium glass fiber lasers, are fed from a fiber laser oscillator operated specifically in the longitudinal made. A fiber splitter arranged at the output of the fiber laser oscillator distributes the pumping energy generated by the fiber laser oscillator into a given number of optical fiber branches within the arrangement. Optical phase shifter elements which are assigned to the optical fibers, shifter elements, together with phase amplifiers in each of these branches, form the latter. This laser fiber arrangement is operated by an electronic control device which shifts the optical phases in the individual branches of the fiber laser arrangement in a manner that compensates for atmospheric turbulence effects on the propagation path of the laser radiation to the target. Thus, an optimal focusing of the entire laser radiation onto a remotely predefined target or a target point is achieved.

To obtain the control signals, the light scattered back from the target point at the propagation path to the transmitter (thus the fiber laser arrangement) is guided by a beam splitter to a wave front sensor, which measures the phase front of the light. From the measuring signal, the wave front phase-conjugated thereto is computed in an electronic control unit. Subsequently, the input signals are derived therefrom for controlling the optical phase shifter elements in the fiber laser arrangement, a fiber laser array.

A portion of the fiber laser radiation emitted by the fiber laser arrangement in the output beam is guided via a second beam splitter to a detector arrangement, and is coherently mixed therewith the beam of a local oscillator laser. From the mixed signals of the individual detectors, the respective phase differences in the individual fiber laser branches are determined and are used in the electronic control system for the intended phase shifting. In this manner, an optimal phase coupling of the individual fiber laser branches of the arrangement is achieved for the desired intensity of the emitted laser radiation in the target point.

To obtain effective control signals, the target point, according to the invention, can also be exposed to the radiation of a separate illumination laser.

The phase-coupled fiber laser array according to the invention, consisting of a number of fiber laser amplifiers and fed by a common master oscillator, avoids the use of mirrors for compensating atmospheric turbulences. It also improves the beaming quality by targeted focusing of the laser radiation on a small spot size and, because of the division of the fiber laser array into individual fiber laser amplifier branches of any quantity, the total output of laser radiation that is emitted can be increased in a scalable manner, without any reduction of the focusing quality of the radiation in the target point because of turbulence interferences.

Possible applications of the invention are the optical application called "free air" over very long distances, optical countermeasures against sensors, as well as the use of lasers against flying targets.

The invention is described below by reference to the operating concept of an embodiment of a phase-coupled fiber laser arrangement with compensation of occurring turbulence interferences illustrated in the drawing.

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic illustration of a representative embodiment of a fiber laser arrangement according to the invention.

DETAILED DESCRIPTION OF THE DRAWINGS

Referring to the FIGURE, a fiber laser arrangement according to the invention (referred to herein as a fiber laser array, and as a whole, having the reference number 10) comprises a number (four in the illustrated embodiment) of laser-diode-pumped neodymium glass fiber lasers as fiber laser amplifiers 12.1 to 12.4. The glass fiber lasers obtain their pumping energy from a common fiber laser master oscillator 13 by means of a fiber splitter 15. Pumping energy is distributed into the predefined number of glass fiber laser branches, via a fiber splitter, 15, in a manner known per se. An electro-optical phase shifter 14.1 to 14.4 is assigned to each fiber laser amplifier 12.1 to 12.4, and is controlled by way of a common electronic control unit 16.

The common electronic control unit 16 receives its controlling input signals from a laser phase sensor 20 and a wave front sensor 22.

The radiation leaving the above-described fiber laser array is aimed at a target or a target point 24. To optimize the generation of control signals for the phase shifters 14, an illumination laser 30 is aimed at the target point 24. Moreover, a beam splitter 32 assigned to the wave front sensor 22 and a beam splitter 33 assigned to the laser phase sensor 20 are inserted into the beam path. The purpose of the beam splitter 32 is to guide the light scattered back from the target point 24 on the propagation path to the fiber laser array onto the wave front sensor 22 which measures the phase front of the light. The measuring signal determined in this manner is fed to the electronic control system 16.

The second beam splitter 33 guides a portion of the laser radiation emitted by the fiber laser array to the laser phase sensor 20 and is coherently mixed there with the beam of a local oscillator 26.

To achieve optimal phase coupling of the individual fiber branches of the fiber laser array 10, and to increase the intensity of the emitted laser radiation in the target point 24, the respective phase differences in the individual fiber laser branches are determined from the mixed signals of the individual detectors (sensors 20 and 22), and are evaluated in the electronic control unit 16 for the control.

In the manner described above, the influences of turbulence between the fiber laser array 10 and the target 24 are eliminated, and a surprisingly good focusing of the radiation arriving at the target onto a very small spot size is achieved. The fiber splitter 15 facilitates changing of the scaling of the total output of the laser radiation of the fiber laser array, by connecting or disconnecting an arbitrary number of branches of the fiber laser amplifiers 12.1 to 12.$n$, without reducing the quality of the focusing of the radiation on the target because of turbulences.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

10 Fiber laser arrangement/array
12.1-12.$n$ fiber laser amplifiers
13 fiber laser master oscillator
14.1-14.$n$ electro-optical phase shifters
15 fiber splitter
16 electronic control unit
20 laser phase sensor
22 wave front sensor
24 target/target point
26 local oscillator
30 illumination laser
32 beam splitter
33 beam splitter

What is claimed is:

1. Fiber laser arrangement having a high beaming power, said fiber laser arrangement comprising:
   a plurality of continuously operating coherent individual fiber lasers;
   a common master oscillator which is operated in the longitudinal mode, and which distributes pumping energy into the individual fiber lasers, via a fiber splitter;
   a plurality of integrated electro-optical phase shifters, one such phase shifter being assigned to each individual fiber laser; and
   an electronic control unit: wherein
   said electronic control unit controls said phase shifters to displace the optical phases in individual fiber lasers to compensate atmospheric turbulence effects on a propagation path of the laser radiation to a target, so as to achieve optimal focusing of the entire laser radiation onto a remote target;
   wherein: to measure a phase front of light scattered back from the target on the propagation path of the laser radiation of the fiber laser arrangement, said scattered light is guided, via a first beam splitter situated in the propagation path, to wave front sensors; and
   measuring signals of the wave front sensors can be guided to the electronic control unit for determining signals for controlling the phase shifters; wherein for determining the respective phase differences among the individual fiber lasers, a second beam splitter is arranged in an output beam of the radiation emitted by the fiber laser arrangement;
   a laser phase sensor is assigned to the second splitter; and output signals of said laser phase sensor are guided to the electronic control unit;
   the fiber laser arrangement further comprises a local oscillator laser;
   said second beam splitter diverts a portion of the radiation emitted by the individual fiber lasers;
   a beam of the local oscillator laser is coherently mixed with said portion of the radiation that is diverted by the second beam splitter, and the combined radiation is guided to said laser phase sensor; and
   said electronic control unit determines respective phase differences, among the respective individual fiber lasers as a function of the mixed signals generated by said laser phase sensor and said wave front sensors.

2. The fiber laser arrangement according to claim 1, wherein:
   from said measuring signals of said wave front sensors, said electronic control unit computes a wave front that is phase conjugated to said measuring signals; and
   said electronic control unit derives input signals for controlling the electro-optical phase shifters, based on the computed phase conjugated wave front.

* * * * *